No. 690,765. Patented Jan. 7, 1902.
T. PEDERSEN.
SAFETY HOOK AND EYE.
(Application filed Jan. 2, 1901.)
(No Model.)

WITNESSES:

INVENTOR
Thomas Pedersen
BY
ATTORNEYS

United States Patent Office.

THOMAS PEDERSEN, OF KRAGERO, NORWAY.

SAFETY HOOK AND EYE.

SPECIFICATION forming part of Letters Patent No. 690,765, dated January 7, 1902.

Application filed January 2, 1901. Serial No. 41,761. (No model.)

*To all whom it may concern:*

Be it known that I, THOMAS PEDERSEN, a subject of the King of Sweden and Norway, residing at Kragero, Norway, have invented certain new and useful Improvements in Safety Hooks and Eyes; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

My invention relates to hooks and eyes, and has for its object to provide a safety-hook of a simple construction, which is handy in use and yet capable of affording perfect safety against any unintentional disengagement of the hook and eye.

My invention consists in the provision upon the hook of a loop extension projecting beyond the front end of the hook and having about midway of its ends two salient knees adapted to project into the eye and lock the same in engagement with the hook.

Figure 1:
Figure 2:
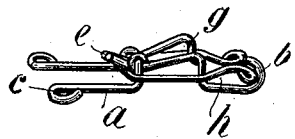

In the annexed drawings, Figure 1 is a plan view showing separately a hook and eye embodying my invention, and Fig. 2 is a perspective view illustrating the same after being hooked together.

I have shown the hook as consisting of two members $a$ and $b$. The former is a wire loop adapted to be fastened by eyelets $c$ at the rear end and having rectangular corners at its front end, which is bent outwardly to a right angle for engagement with the front portion of eye $d$. In order to lock the eye in engagement with the hook $a$, I provide a projection $e$, consisting in the drawing of the ends of the extension-loop $b$, said ends being wound around the cross-piece $f$ of the member $a$, so as to form a hinge-joint at or near the middle of the hook $a$ $b$. The wire extension-loop $b$, whose loop is designed to be sewed to the cloth, is provided at or near its middle part with two salient knees $g$, standing, preferably, at such a distance apart that when forcing the eye $d$ down upon the same into the position shown in Fig. 2 the eye must either yield laterally or cause the knees to yield inwardly.

In coupling the parts together I simply hook the eye $d$ in upon the member $a$, with its cross-bar under the projection $e$, and then force the rear portion of the eye down upon the knees $g$. The inwardly-bent ends $h$ of the eye bearing against said knees will prevent it from being dislocated forwardly, and consequently from escaping to the outer side of the projection $e$ until the rear part of the eye is lifted out of engagement with said knees.

In comparatively small hooks where the toggle-joints (shown at $f$) may be dispensed with the members $a$ and $b$ may be formed integrally and the projection $e$ being in this case made in the form of a curve or bend upon the cross-wire $f$.

I claim—

1. In combination, a hook formed of a loop and a loop extension connected therewith, said extension having upwardly-projecting knees, the projections at the junction of the loop and loop extension and an eye having a portion to engage the said projection and portions to engage the said knees, substantially as described.

2. A hook having a cross-bar provided with a projection extending in one direction, said hook having also upwardly-extending knees which face in the opposite direction from the projection, and an eye having a portion to fit under the projection and portions to engage the knees, substantially as described.

In witness whereof I have hereunto set my hand in presence of two witnesses.

THOMAS PEDERSEN.

Witnesses:
  JOH. FR. JUEL,
  KARL AUGESTAD.